United States Patent
Avergård et al.

(10) Patent No.: US 10,299,497 B2
(45) Date of Patent: May 28, 2019

(54) METHOD FOR DISCHARGE CONTROL OF A SEPARATOR

(71) Applicant: TETRA LAVAL HOLDINGS & FINANCE S.A., Pu (CH)

(72) Inventors: Pontus Avergård, Lomma (SE); Ake Ölund, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 104 days.

(21) Appl. No.: 15/348,502

(22) Filed: Nov. 10, 2016

(65) Prior Publication Data

US 2017/0135382 A1    May 18, 2017

(30) Foreign Application Priority Data

Nov. 13, 2015 (SE) ..................... 1551472

(51) Int. Cl.
| | |
|---|---|
| *A23L 3/00* | (2006.01) |
| *A23C 7/00* | (2006.01) |
| *A01J 11/10* | (2006.01) |
| *B04B 11/02* | (2006.01) |

(52) U.S. Cl.
CPC ............... *A23L 3/003* (2013.01); *A01J 11/10* (2013.01); *A23C 7/00* (2013.01); *B04B 11/02* (2013.01); *A23V 2002/00* (2013.01)

(58) Field of Classification Search
CPC .. A23L 3/003; A01J 11/10; A23C 7/00; B04B 11/02; A23V 2002/00
See application file for complete search history.

(56) References Cited

U.S. PATENT DOCUMENTS

| | | | |
|---|---|---|---|
| 2,236,470 A * | 3/1941 | De Jonge ................ | A23L 3/22 165/101 |
| 3,656,685 A | 4/1972 | Kjellgren | |
| 3,983,257 A | 9/1976 | Malmberg et al. | |
| 2007/0082802 A1 | 4/2007 | Klapper et al. | |
| 2010/0081552 A1 | 4/2010 | Chan | |
| 2015/0196003 A1* | 7/2015 | Brayer ................... | A01J 5/007 119/14.08 |

FOREIGN PATENT DOCUMENTS

| | | |
|---|---|---|
| GB | 1380769 A | 1/1975 |
| JP | 2-224624 * | 9/1990 |

* cited by examiner

*Primary Examiner* — Anthony J Weier
(74) *Attorney, Agent, or Firm* — Buchanan Ingersoll & Rooney PC

(57) ABSTRACT

A method for discharge control of a separator including an inlet for a dairy product, a first outlet conduit for a first processed dairy product, and a second outlet conduit for a second dairy product. The first processed dairy product having a higher fat concentration than the second processed dairy product. The method involves detecting a flow rate of the first processed dairy product in the first outlet conduit, controlling the flow rate of the first processed dairy product in the first outlet conduit by regulating an opening degree of a regulating valve connected to the first outlet conduit, detecting the opening degree of the regulating valve, and discharging the separator when the opening degree of the regulating valve exceeds a predetermined value. The invention also relates to a separator for separating a dairy product into a first processed dairy product and a second processed dairy product.

8 Claims, 1 Drawing Sheet

METHOD FOR DISCHARGE CONTROL OF A SEPARATOR

CROSS-REFERENCE TO RELATED APPLICATIONS

The invention is related to Swedish patent application No. 1551472-2, filed on 13 Nov. 2015, which is incorporated herein by reference.

TECHNICAL FIELD

The invention relates to a method for discharge control of a separator, and a separator with discharge control.

BACKGROUND ART

Standardization means that the dairy processes the incoming whole milk, the fat content of which may vary, to make market milk with a specified constant fat content—standardized milk. If the specified constant fat content is higher than that of the incoming whole milk, the process will involve removing some of the skim milk, and the dairy will have a skim milk surplus. Normally, however, standardization proceeds to a lower fat content than that of the incoming whole milk. The process therefore leaves a surplus of fat, which can be used for example to make butter. The same type of standardization applies also for e.g. whey standardization, cream concentration, milk separation at high temperatures, where the milk is melted, or at lower temperatures, where the milk fat is solid or partly solid, or milk with ingredient addition.

The process of standardization can be arranged in three different ways: prestandardization, poststandardization, or direct standardization in line. The first step in all three methods is to separate whole milk into cream and skim milk.

Prestandardization means that the milk is standardized before being pasteurized. To adjust the fat content upward, separated cream is mixed with raw whole milk in tanks in proportions calculated to give the required fat content. To standardize to a lower fat content, the raw whole milk is diluted with separated skim milk. After analysis and adjustment, the standardized milk is pasteurized.

In poststandardization, pasteurized whole milk is mixed in tanks with either cream or skim milk, according to whether the fat content is to be adjusted upward or downward, in the same way as in the case of prestandardization. However, as poststandardization involves mixing already pasteurized products, some risk of reinfection is involved. Both methods, moreover, require the use of large, bulky tanks, and the work of analysis and adjustment is labour-intensive.

The third method, direct standardization, has therefore been an attractive alternative for industrial needs. In this method, the fat content is adjusted to the desired level by immediate remixing of a calculated proportion of the cream flow from the separator to the skim milk line.

Direct standardization begins with separation of cold or preheated whole milk into cream and skim milk of constant fat content. A regulated amount of cream is then remixed with the skim milk in an in-line system immediately after the separator to obtain standardized milk of the required fat content.

Some small amounts of bacteria and spores will unavoidably be present in the flow of raw milk. The low flow of bacteria and spore concentrate in conjunction with high flow of product through the separator leads to sensitivity to blockage due to bacteria and spore residues. To prevent this discharges are made at certain time intervals. When discharging the separator all products is discarded and the separator is reset to its initial state, free from residues of spores and bacteria. Each discharge of the separator, however, by its nature leads to product loss which is not desired. To ensure that the concentration of bacteria and spores in the end product is not too high the separator is discharged well before any risk of too high bacteria concentration in the product. However, the clogging of the separator is not linear and depends on the batch of the raw milk etc. Therefore, the time interval for discharge of the separator has to be set to the worst case scenario, leading to the situation that the separator in most cases is discharged long before it would have to.

There is thus a need of a better control system for discharging of separators in the dairy industry to reduce the amounts of discarded product and thereby reduce losses and costs in the dairy.

SUMMARY OF THE INVENTION

It is an object of the present invention to improve the current state of the art, to solve the above problems, and to provide an improvement of dairy processing in a separator.

According to a first aspect of the invention, these and other objects are achieved in full, or at least in part, by a method for discharge control of a separator. The separator comprises an inlet for a dairy product, a first outlet conduit for a first processed dairy product, and a second outlet conduit for a second dairy product. The first processed dairy product having a higher fat concentration than the second processed dairy product. The method comprising the steps of detecting a flow rate of said first processed dairy product in said first outlet conduit, controlling said flow rate of said first processed dairy product in said first outlet conduit by regulating an opening degree of a regulating valve connected to said first outlet conduit, detecting said opening degree of said regulating valve, and discharging said separator when said opening degree of said regulating valve exceeds a predetermined value. The method makes it possible to better control the flow of bacteria and spore concentrate in the separator. Also, by using the inventive method, product losses due to the discharge process will be heavily decreased since it is based on necessity instead of on a predetermined time interval.

The method may further comprise the step of providing an output signal based on said opening degree of said regulating valve to indicate the amount of build up in said first outlet conduit due to impurities in said separator. Also, the method may further comprise the step of analyzing said amount of build up to determine the impurity concentration in said first processed dairy product. This gives the operator a better overview of the overall dairy process. In addition, the process may be automated to a greater extent by implementing the method described above.

According to a second aspect of the invention, the objects are achieved in full, or at least in part, by a separator for separating a dairy product into a first processed dairy product and a second processed dairy product, wherein said first processed dairy product has a higher fat concentration than the second processed dairy product. The separator comprises a first outlet conduit for said first processed dairy product, a second outlet conduit for said second dairy product, a flow rate sensor adapted to detect a flow rate of said first processed dairy product in said first outlet conduit, a regulating valve connected to said first outlet conduit, a valve sensor adapted to detect an opening degree of said regulating valve, and a control unit connected to said flow rate sensor, said regulating valve and said valve sensor. The control unit is adapted to initiate a discharge of said separator when said opening degree of said regulating valve exceeds a predetermined value. The same advantages as described for the method above also apply for the separator.

In a preferred embodiment of the invention, the regulating valve may be arranged downstream of said flow meter.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF PREFERRED EMBODIMENTS OF THE INVENTION

Figure 1:
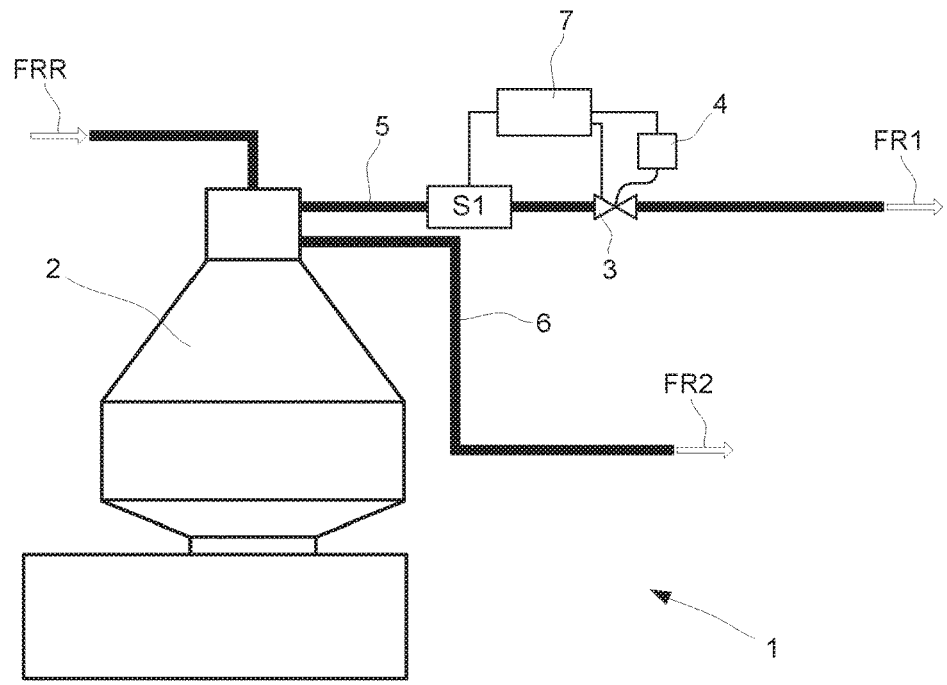
FIG. 1 is a side view of a separator with discharge control according to one exemplary embodiment of one aspect of the invention.

FIG. 1 shows a separator 1 for separating a dairy product into a first processed dairy product and a second processed dairy product. The separator 1 has an inflow of a dairy product with a flow rate FRR. The separator 2 separates the dairy product, e.g. whole milk, into a first processed dairy product flowing out through a first outlet conduit 5 with a flow rate FR1, and a second processed dairy product flowing out through a second outlet conduit 6 with a flow rate FR2. A flow rate sensor S1 is arranged on the first outlet conduit 5 to detect a flow rate of the first processed dairy product in the first outlet conduit 5. The flow rate sensor S1 may e.g. be a mass flow meter able to measure mass flow and volume flow or a density meter. Downstream of the flow rate sensor S1, a regulating valve 3 is placed on the first outlet conduit 5, being able to control the flow FR1 of the first processed dairy product. A valve sensor 4 is connected to the regulating valve 3 in order to detect an opening degree of the regulating valve 3. The separator further comprises a control unit 7 connected to the flow rate sensor S1, the regulating valve 3, and the valve sensor 4. This way, the control unit 7 will be able to continuously read the opening degree of the regulating valve 3 based on information received from the valve sensor 4, and initiate a discharge of the separator 1 when the opening degree of the regulating valve 3 exceeds a predetermined value which has been stored in the control unit 7.

Normally, the flow of bacteria and spore concentrate in the outlet conduits 5, 6 in conjunction with a high flow of dairy product will lead to a high sensitivity to blockage within the outlet conduits 5, 6. To prevent that type of blockages, discharges of the separator 1 is conducted. With conventional separators, such discharges have been conducted regularly according to a predetermined time interval.

The separator 1, according to the present invention, will however make it possible to control the flow of bacteria and spore concentrate in the outlet conduits 5, 6 by supervision of the valve sensor 4 and controlling of the regulating valve 3 through the control unit 7. If valve has opened to a predetermined level to be able to keep a desired flow rate, a discharge is performed. This way, the discharges will be conducted based on necessity instead of on a predetermined time interval. In turn, by using such a method, product losses due to the discharge process will be heavily decreased.

Figure 2:
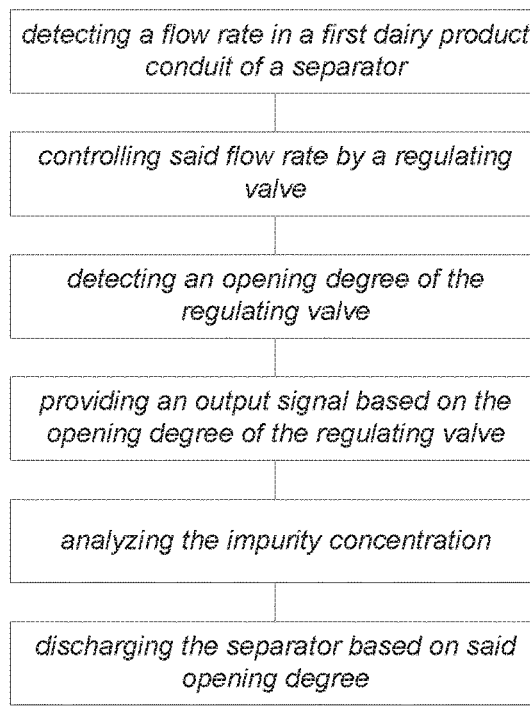
FIG. 2 is a flow chart of a method for discharge control of a separator according to one exemplary embodiment of another aspect of the invention.

FIG. 2 is a flow chart illustrating the steps in a method for a controlled discharge control of a separator 1. It should be noted that the method described herein may be used in any suitable device or system and is not limited to use in the separator 1 disclosed herein. The method comprises the steps of detecting a flow rate of the first processed dairy product in the first outlet conduit, controlling the flow rate of the first processed dairy product in the first outlet conduit by regulating an opening degree of a regulating valve connected to the first outlet conduit, detecting the opening degree of the regulating valve, and discharging the separator when the opening degree of the regulating valve exceeds a predetermined value.

Even though specific wording has been used in some parts this should not be understood as a restriction of the general concept, but as examples.

For instance, the wording "dairy product" should be understood as any product fed into the separator and not necessarily an unprocessed milk product.

The skilled person realizes that a number of modifications of the embodiments described herein are possible without departing from the scope of the invention, which is defined in the appended claims.

The invention claimed is:

1. Method for discharge control of a separator, said separator comprising an inlet for a dairy product, a first outlet conduit for a first processed dairy product, and a second outlet conduit for a second dairy product, said first processed dairy product having a higher fat concentration than the second processed dairy product, said method comprising:
    detecting a flow rate of said first processed dairy product in said first outlet conduit,
    controlling said flow rate of said first processed dairy product in said first outlet conduit by regulating an opening degree of a regulating valve connected to said first outlet conduit,
    detecting said opening degree of said regulating valve, and
    discharging said separator of all product when said opening degree of said regulating valve exceeds a predetermined value.

2. Method according to claim 1, further comprising providing an output signal based on said opening degree of said regulating valve to indicate the amount of build up in said first outlet conduit due to residues from the dairy product in said separator.

3. Method according to claim 2, further comprising analyzing said build up of residues to determine the impurity concentration in said first processed dairy product.

4. Method for discharge control of a separator comprising:
    introducing whole milk into the separator;
    separating the whole milk in the separator into a first processed dairy product flowing out of the separator through a first outlet conduit and a second processed dairy product flowing out of the separator through a second outlet conduit, the first processed dairy product having a higher fat concentration than the second processed dairy product, the first processed dairy product flowing through the first outlet conduit also flowing through a regulating valve positioned along the first outlet conduit to control flow of the first processed dairy product;

detecting a flow rate of the first processed dairy product in the first outlet conduit;

controlling the flow rate of the first processed dairy product in the first outlet conduit by regulating an opening degree of the regulating valve;

detecting the opening degree of the regulating valve; and discharging the separator of all product when the opening degree of the regulating valve exceeds a predetermined value.

5. Method according to claim 4, further comprising outputting a signal based on the opening degree of the regulating valve to indicate the amount of build-up in the first outlet conduit due to residues from the dairy product in the separator.

6. Method according to claim 5, further comprising analyzing the build-up of residues to determine the impurity concentration in the first processed dairy product.

7. Method according to claim 5, wherein the detecting of the flow rate of the first processed dairy product in the first outlet conduit comprises detecting the flow rate of the first processed dairy product by a flow rate sensor positioned upstream of the regulating valve.

8. Method according to claim 7, wherein the flow rate sensor is connected to a control unit, and wherein the regulating of the opening degree of the regulating valve includes the control unit regulating the opening degree of the regulating valve.

* * * * *